US006998975B2

(12) United States Patent
Buck et al.

(10) Patent No.: US 6,998,975 B2
(45) Date of Patent: Feb. 14, 2006

(54) METHOD AND SYSTEM FOR DETERMINING TIRE PRESSURE IMBALANCES

(75) Inventors: M. Scott Buck, Commerce Township, MI (US); Thomas H Tu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 66 days.

(21) Appl. No.: 10/679,646

(22) Filed: Oct. 6, 2003

(65) Prior Publication Data

US 2005/0073400 A1    Apr. 7, 2005

(51) Int. Cl.
*B60C 23/00* (2006.01)
(52) U.S. Cl. ........................................ 340/447; 340/442
(58) Field of Classification Search ................ 340/442, 340/444, 445, 446, 447; 73/146.2, 146.3, 73/146.4, 146.5, 146.8
See application file for complete search history.

(56) References Cited

U.S. PATENT DOCUMENTS

| | | | | |
|---|---|---|---|---|
| 5,731,516 A | * | 3/1998 | Handfield et al. | ......... 73/146.5 |
| 5,856,245 A | * | 1/1999 | Caldwell et al. | .............. 442/76 |
| 5,963,128 A | * | 10/1999 | McClelland | ................ 340/447 |
| 5,987,980 A | * | 11/1999 | Mangafas et al. | ......... 73/146.8 |
| 6,535,116 B1 | * | 3/2003 | Zhou | ......................... 340/447 |

* cited by examiner

Primary Examiner—Van T. Trieu
(74) Attorney, Agent, or Firm—Laura C. Hargitt

(57) ABSTRACT

A tire pressure detection system including a pneumatic tire, a valve system coupled to the pneumatic tire, a switch contained within the valve system, the switch including a transmitter, a receiver in wireless communication with the transmitter; and where when the switch is actuated the switch will transmit tire pressure information to said transmitter.

9 Claims, 4 Drawing Sheets

US 6,998,975 B2

METHOD AND SYSTEM FOR DETERMINING TIRE PRESSURE IMBALANCES

TECHNICAL FIELD

This invention relates to a method and apparatus for determining imbalances in tire pressure on vehicles. More specifically the present invention relates to a valve integrated tire pressure sensor.

BACKGROUND OF THE INVENTION

Automobiles and other vehicles typically utilize pneumatic tires mounted on a wheel for gripping the surface of the road. Tire over-inflation and under-inflation can lead to uneven tread wear, reduced grip at the tire-to-road contact area, and reduced tire performance. The handling characteristics of a wheeled vehicle are directly related to the amount of friction/grip, both lateral and longitudinal, obtained by the tire-to-road interface. Increased regulation has created the need to monitor the pressure of tires.

Direct tire pressure monitoring systems (TPMS) utilize radio frequency (RF) transmitters that are located in each wheel/tire assembly. Each sensor typically contains a unique identification (ID) code with its own RF data stream that is learned by the receiving electronic device to allow the TPMS to properly interpret each sensor's data by its physical location on the vehicle. Relearning is required in the factory when the tires are installed, when the customer alters sensor locations (rotate wires, change flat), or when a damaged sensor has been replaced. Existing auto-locations systems permit the learning operation to occur automatically without customer intervention, however these systems these systems require specialized hardware and are not cost effective.

SUMMARY OF THE INVENTION

The present invention provides a system to accurately monitor tire pressure imbalance and permit the learning operation to be performed manually without the use of an external electronic device or sampled pressure change.

The present invention comprises a valve stem integrated tire switch. The present invention permits a TPMS system to transmit a unique relearn RF transmission without the use of an unique external device such as a portable magnetic or electronic device or sampled pressure change detection algorithm. Depression of the valve integrated switch located inside the tires' valve stem will trigger the sensor to measure the current data (pressure, temperature etc.) and broadcast its relearn code, sensor ID, and any measured data. Activation of the integrated valve stem switch can be accomplished by removing the valve stem cap and pressing down the valve pin with a finger or any small object that will fit in the valve stem. The sensor assembly electronics will monitor the switch state using a polled or interrupt based logic.

DESCRIPTION OF THE PREFERRED EMBODIMENT

Figure 1:
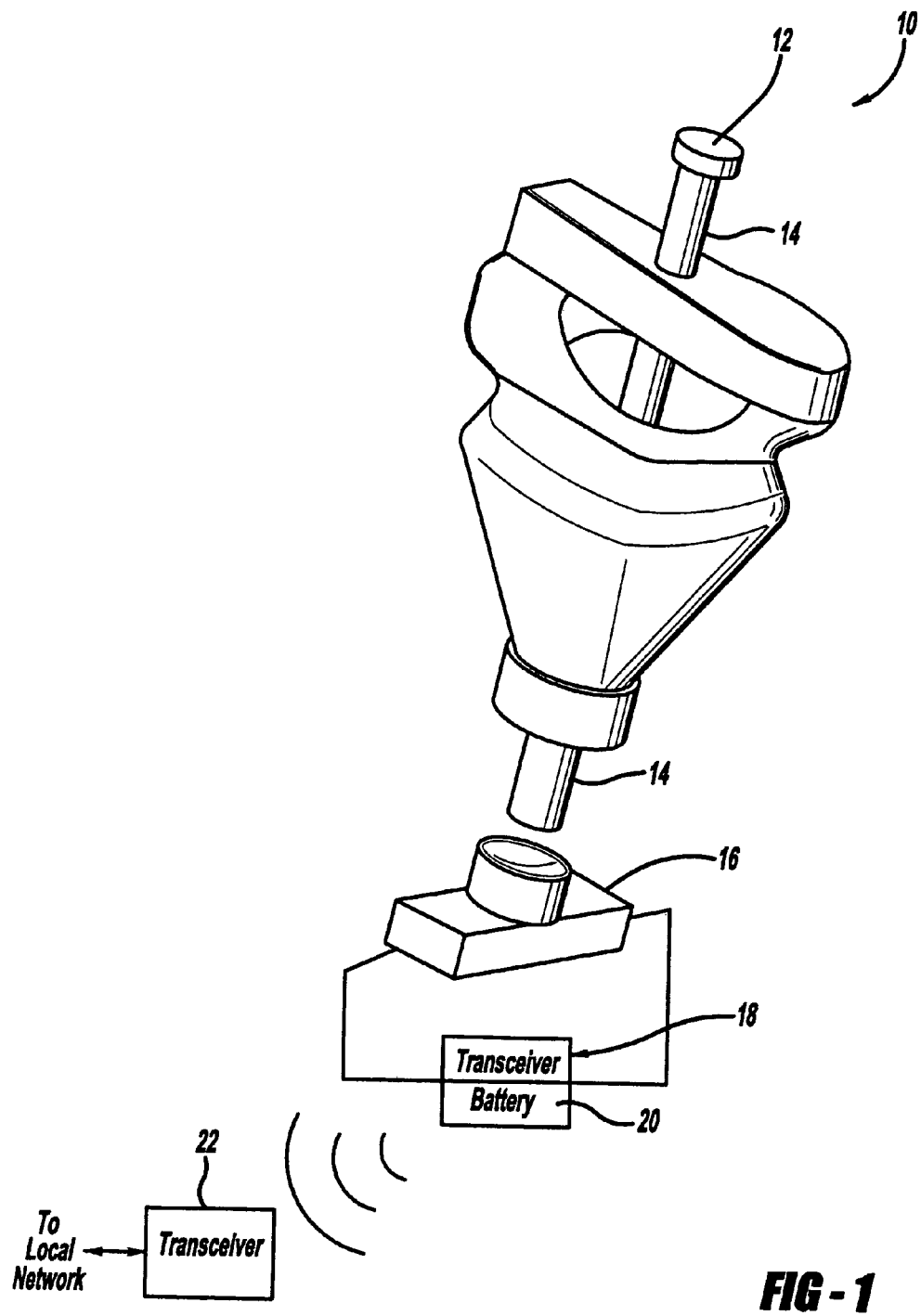
FIG. 1 is a diagrammatic drawing of an integrated tire switch of the present invention.

FIG. 1 is a diagrammatic drawing of a valve integrated tire switch 10 of the present invention. The integrated switch 10 is constructed to be located in a tire's valve stem and allow pressurized air flow into and out of a pneumatic tire, as is normally done in the art. The integrated switch 10 includes a plunger 12 that depresses a valve pin 14 to actuate a sensor or switch 16. The sensor or switch 16 type includes, but is not limited to any mechanical or proximity switching technology known in the art. The sensor or switch 16 is wired to a transmitter or transceiver 18 powered by a battery 20. In alternated embodiments of the present invention, power for the switch 16 may be generated by a piezoelectric system that converts the kinetic energy of the rolling wheel into electrical energy. The transmitter 18 will transmit a unique identification code to a second transceiver or receiver 22 located in the electrical infrastructure of the vehicle. The second transceiver or receiver 22 may be integrated to a number of electronic controllers that include, but are not limited to, a body computer, an anti-lock brake controller, a powertrain controller, and a remote input/output node.

The second transceiver or receiver 22 records the position of the actuated integrated tire switch 10 and displays the pressure information to an operator of a vehicle on an instrument panel or similar display device. The second transceiver or receiver 22 is preferably equipped with an automotive network interface including, but not limited to, J1850, CAN, and GMLAN to transfer tire pressure information to various controllers in the vehicle.

Figure 2:
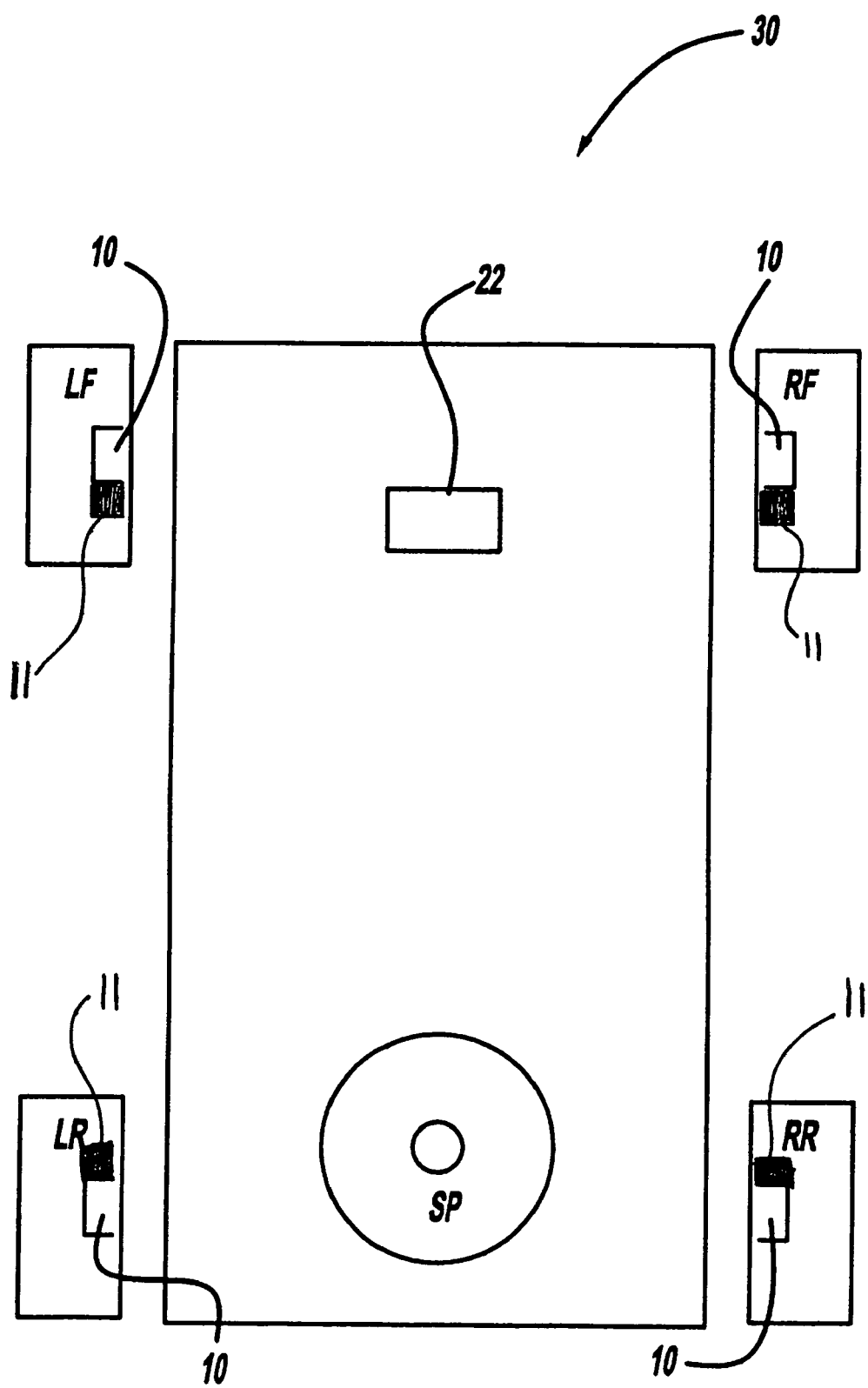
FIG. 2 is a diagrammatic drawing of a vehicle including the integrated tire switches of the present invention.

FIG. 2 is a diagrammatic drawing of a vehicle 30 having pneumatic tires equipped with the integrated tire switches or sensors 10 of the present invention. The vehicle 30 includes a left front (LF) tire, a left rear (LR) tire, a right front (RF) tire, a right rear (RR) tire, and a spare (SP) tire. The second transceiver or receiver 22 is located in the vehicle 30 electrical infrastructure. The tire switches are operatively coupled to a rolling sensor(s) 11 to indicate movements of the tires.

Figure 3A:
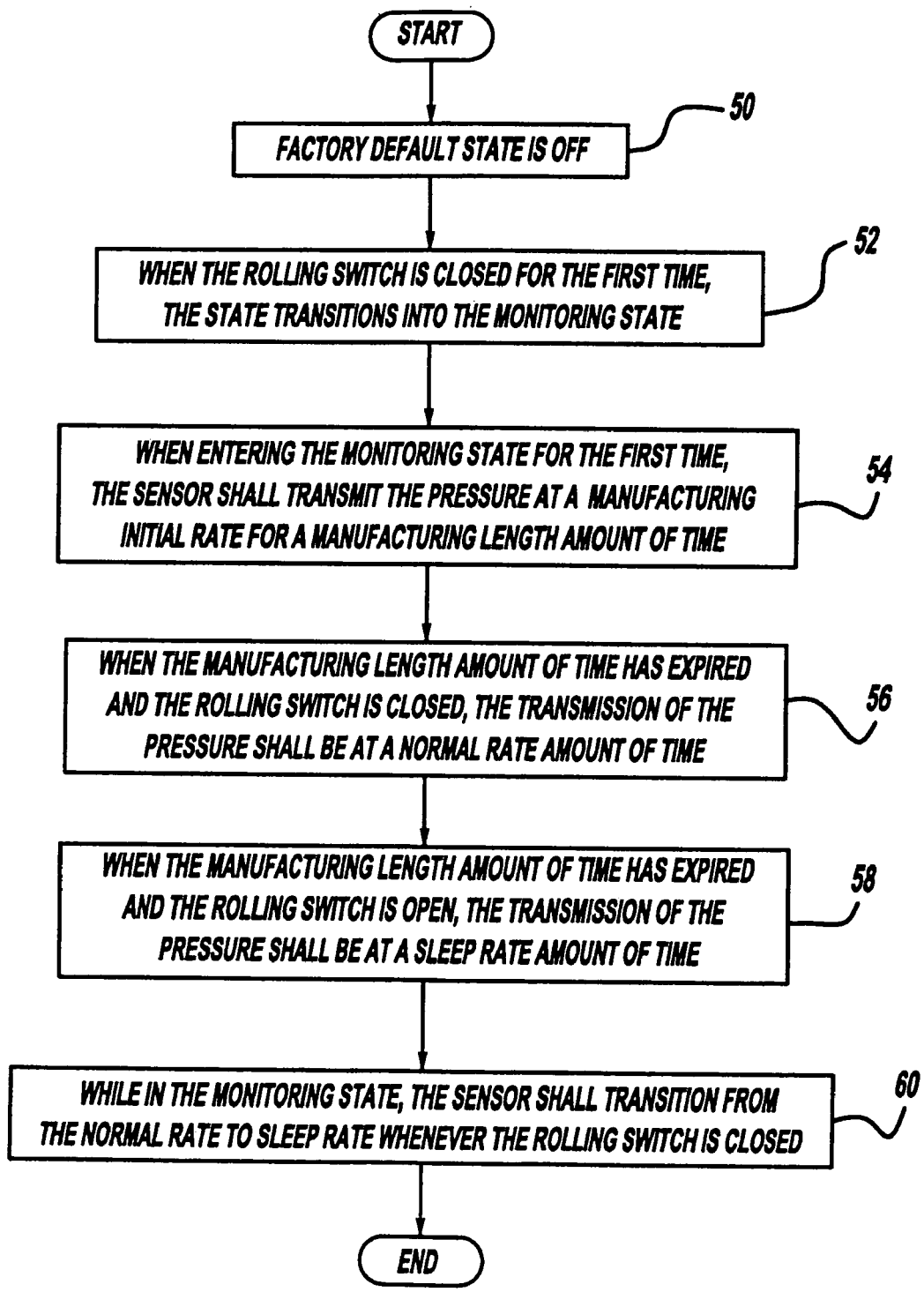
FIGS. 3A and 3B are flow charts of preferred methods of the present invention.

FIG. 3A is a flow chart of a preferred method of the present invention. The initial state of the integrated tire switch upon initial vehicle production illustrated by block 50 is OFF. When a rolling switch (in the tire or proximate the tire) is closed for the first time, the state of the system transitions into the monitoring state at block 52. At block 54, when entering the monitoring state for the first time, the integrated tire switches 10 transmit the pressure of the tires at a certain rate defined as the manufacturing rate for a certain amount of time defined as the manufacturing time. The manufacturing rate and time have values that ensure that initial tire pressure information is transmitted by the integrated tire switches 10 to the transceiver 22. At block 56, upon expiration of the manufacturing time, and if a rolling condition is detected by the rolling switch, the integrated tire switches 10 will transmit at a normal rate defined as substantially every 10 seconds, but any transmit period is considered within the scope of the present invention.

At block 58, when a rolling condition is not detected and the manufacturing time has expired the integrated tire switches 10 will transmit at a sleep rate defined as every three hours, but any sleep rate is within the scope of the present invention. While in the monitoring mode, at block 60, the integrated tire switches 10 will transition from a normal rate to a sleep rate whenever the rolling switch indicates a rolling condition. The RF transmission bits are configured to inform the transceiver 22 as to the actual state of the integrated tire switches 10.

Figure 3B:
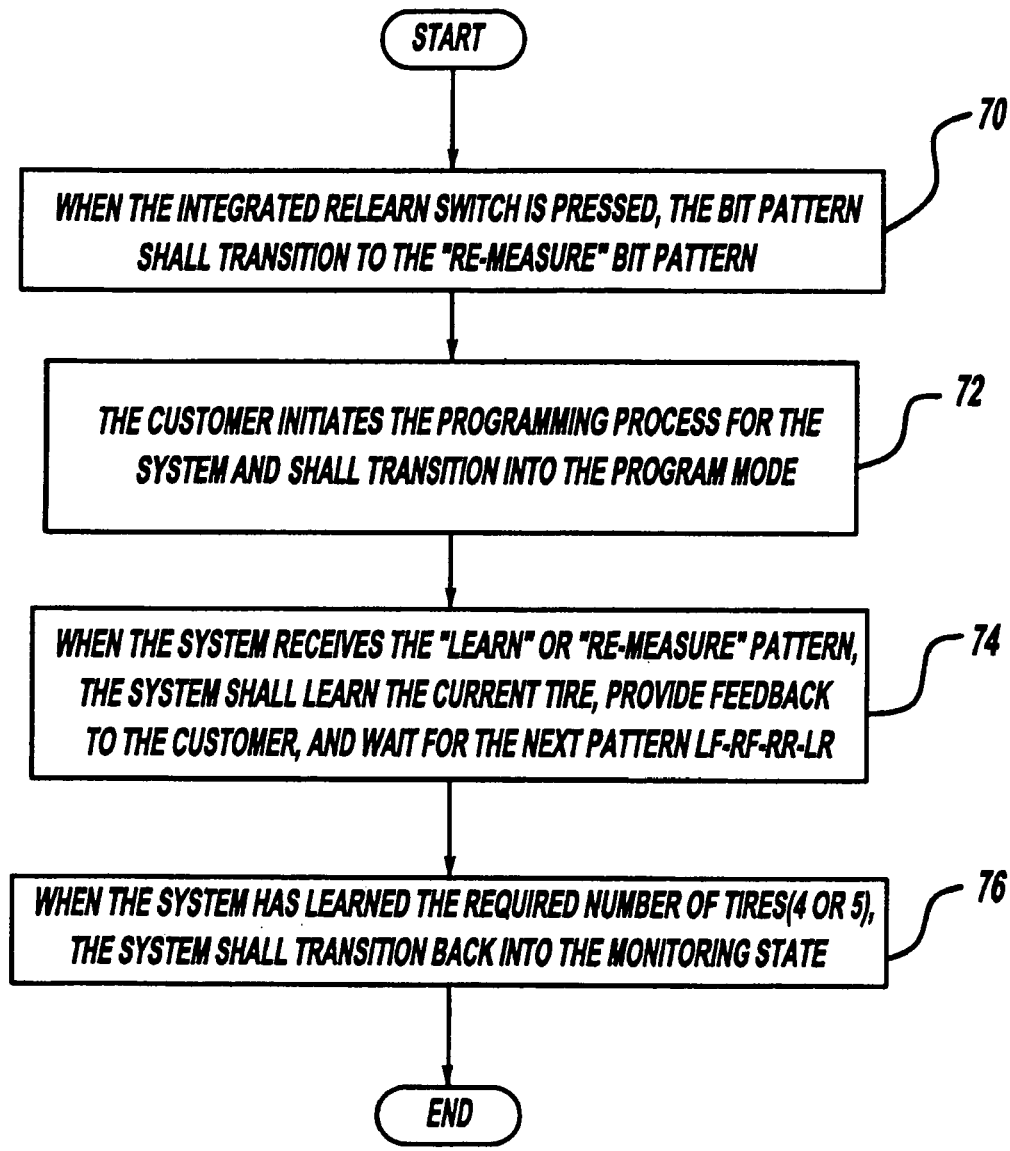

FIG. 3B is a flow chart of a preferred method of the present invention illustrating a method of learning the positions of the integrated tire pressure switches 10 on the vehicle 30. At block 70, a relearn switch present on the vehicle is pressed whenever the tires are rotated, a flat tire is changed, or other changes in tire position have occurred. The relearn switch may be located in the cabin of the vehicle 30 or on the exterior of the vehicle, but is not limited to such. The relearn switch is preferably actuated by the operator of the vehicle and the transceiver 22 enters the relearn or program mode. At block 74, the operator then actuates the integrated tire switches 10 in the following preferred sequence, LF-RF-RR-LR (and SP if present), but any other sequence is considered within the scope of the present invention. The system then transitions back to a monitoring state at block 76. Accordingly the transceiver 22 will record the physical positions of the tire pressure switches 10 according to the preferred sequence and tire pressure ID code.

While this invention has been described in terms of some specific embodiments, it will be appreciated that other forms can readily be adapted by one skilled in the art. Accordingly, the scope of this invention is to be considered limited only by the following claims.

What is claimed is:

1. A tire pressure detection system comprising:
   a pneumatic tire;
   a valve system coupled to said pneumatic tire;
   a switch contained within said valve system, said switch including a transmitter;
   a receiver in wireless communication with said transmitter;
   a manually operated plunger operatively coupled to said switch;
   wherein said manually operated plunger is depressed in a specified sequence to identify the location of said pneumatic tire; and
   wherein when said switch is operative said switch will transmit tire pressure and location information to said receiver.

2. The tire pressure system of claim 1 further comprising a rolling sensor.

3. The tire pressure system of claim 1 wherein said transmitter periodically transmits tire pressure information to said receiver.

4. The tire pressure system of claim 1 wherein said receiver is located in a vehicle body computer.

5. A tire pressure sensor comprising:
   a switch contained within a valve system of a pneumatic tire, said switch including a transmitter;
   a manually operated plunger operatively coupled to said switch, said plunger used in a learn routine to identify the location of said tire pressure sensor;
   wherein said switch is structurally integrated into said valve system; and
   wherein when said switch is actuated said switch will transmit tire pressure information to a receiver.

6. The tire pressure sensor of claim 5 wherein said tire switch is operatively coupled to a rolling sensor.

7. The tire pressure sensor of claim 5 wherein said transmitter periodically transmits tire pressure information to said receiver.

8. A method of determining tire pressure for a vehicle comprising:
   providing tire pressure sensors in the tires of the vehicle;
   depressing manually operated switches integrated into valve stems of the tires of a vehicle in a specific sequence;
   transmitting a unique identification code from said tire pressure sensors to a receiver in the vehicle upon depression of the manually operated switches; and
   learning the position of each said tire.

9. A method of determining tire pressure for a vehicle comprising:
   providing tire pressure sensors in the tires of the vehicle, said tire pressure including a manually operated plunger operatively coupled to tire pressure switches;
   depressing plungers in the tires of a vehicle in a specific sequence;
   transmitting a unique identification code from said tire pressure sensors to a receiver in the vehicle upon depression of the plungers; and
   learning the position of each said tire.

* * * * *